Feb. 28, 1956  E. D. LOW  2,736,336
FLOATS FOR USE IN MEASURING INSTRUMENTS
Filed June 25, 1954

Inventor:
Edward David Low
By his attorneys:
Baldwin & Wight

United States Patent Office 2,736,336
Patented Feb. 28, 1956

2,736,336

FLOATS FOR USE IN MEASURING INSTRUMENTS

Edward David Low, Luton, England, assignor to George Kent Limited, London, England, a company of Great Britain Application June 25, 1954, Serial No. 439,411

Claims priority, application Great Britain June 29, 1953

7 Claims. (Cl. 137—452)

This invention relates to floats for use in measuring instruments of the type having a liquid column of a cross-section only sufficiently greater than the cross-section of the float to allow sideways play of the float under the action of connecting mechanism when the liquid level changes.

In particular the invention relates to a float, e. g. an iron float, used in a mercury manometer, but may be used for any liquid and float where the same conditions prevail.

Previously in mercury manometers of the type described an iron float of circular cross-section and having straight sides has been used. Upstanding from the top surface of the float is an arm which is pivotally connected adjacent its top to a pivoted arm adapted to convey motion of the float to a meter mechanism. As the float rises and falls with change of liquid level, the second arm is rocked about its pivot, with the result that the float is moved laterally across its chamber. As the float moves across the chamber, the gap between the float and the wall of the chamber is increased on one side and decreased on the opposite side. Due to the small clearances generally used these changes in gaps will be considerable in proportion to the clearances and the level of the mercury in the larger gap will rise above that in the smaller gap. This difference in liquid level around the float will give the float a sideways thrust, which will tend to tilt it and so cause an inaccurate reading.

The normal straight sided float also suffers from a further defect. It has been found that when mercury rolls along a solid surface, the value of its angle of contact changes. Thus, when the float is rising, the angle of contact will have one value and when the float is falling, it may have a different value. When the liquid level changes, the effect of the first small change may be masked by the effect of the change in the angle of contact; thus the float may not move for small changes of level and this introduces an error known as "stiction."

The object of the invention is to provide a float which will substantially overcome the errors inherent in a float of the conventional type.

According to the invention, a float of the type described comprises an upper part having a lower surface with a well defined peripheral edge and a lower part having a peripheral edge lying inwardly of the edge and providing such buoyancy, when submerged in the liquid concerned, as to ensure that the upper part is lifted clear of the liquid to the extent that the lower surface of the overhanging upper part is coincident with the surface of the liquid and is gripped by the meniscus.

In the preferred construction the lower part is of circular configuration and has a lower surface, the periphery of which is in stepped disposition with respect to the periphery of the lower surface of the circular upper part and the junction between the lower surfaces of the two parts is rounded to avoid a sharp re-entrant corner. Preferably also the top of the upper part continuously slopes down approximately from the centre to the edge and the bottom of the lower part continuously slopes up from adjacent the centre to the edge.

An embodiment of the invention will now be described with reference to the accompanying drawing in which.

Figure 1:
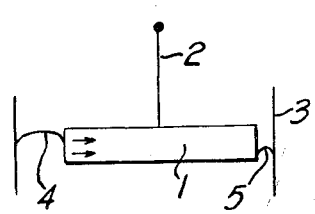
Figure 1 is a diagram showing the conventional prior art type of float positioned off centre in a liquid containing vessel.
Figure 2:
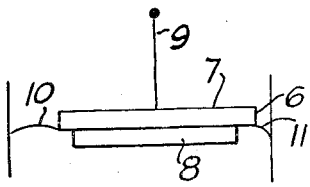
Figure 2 is a diagram showing a float according to the invention positioned off centre in a liquid containing vessel.

Referring now to Figure 1, 1 indicates a conventional straight sided cylindrical float and 2 an upstanding arm which may be connected to a meter mechanism. The float is represented as floating on a liquid in a vessel 3, the float being off centre in the vessel. The liquid meniscus is represented at 4 and 5. In Figure 2, 6 indicates a circular float according to the invention, 7 being an upper part clear of the liquid and 8 a lower part, immersed in the liquid and having the peripheral edge of its lower surface in stepped disposition with respect to the peripheral edge of the lower surface of the upper part. An upstanding arm 9 is secured to the float and adapted to be connected to a meter mechanism.

The liquid meniscus is indicated at 10 and 11.

Figure 3:
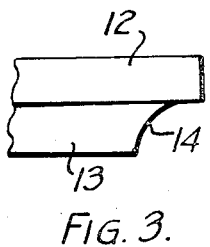
Figure 3 is a detail of a float according to the invention.

In Figure 3 the junction between the lower face of the upper part 12 of the float and the lower face of the lower part 13 of the float is rounded concavely as at 14 to avoid a sharp re-entrant edge.

Figure 4:
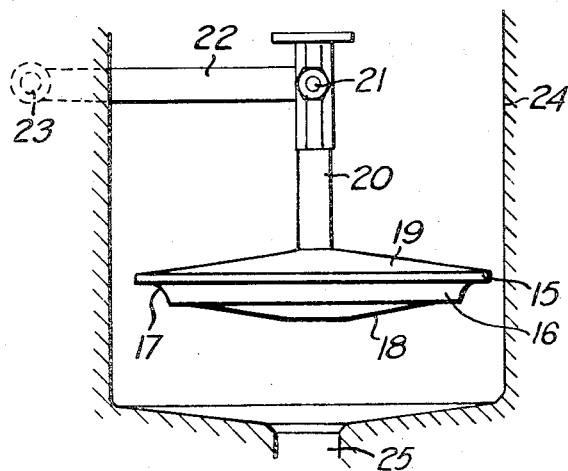
Figure 4 is a view of a modified form of float.

In Figure 4 the float comprises an upper part 15 and a lower part 16. The peripheral junction between the lower surfaces of the parts is rounded concavely as at 17 and the bottom of the lower part 16 is formed with a continuously sloping portion 18 and the top of the upper part with a continuously sloping portion 19. An upstanding arm 20 is secured to the float and is pivotally suspended at 21 from another arm 22 pivoted at 23 to e. g. the meter mechanism. A vessel 24 contains the supporting liquid column and has an inlet opening 25.

As above described when a float 1 of conventional design is moved to an off-centre position as shown in Figure 1 the meniscus at 4 is higher than at 5. The float experiences a thrust in the direction of the arrows and is thus tilted. As shown in Figure 2 the float when in the same off centre position as the float in Figure 1 has the meniscus at the same height all round its periphery and is thus not subjected to a tilting side thrust. Further, since the liquid meniscus 6 and 10 grips the float round the lower peripheral edge of the upper section 7, the liquid does not roll up and down the sides of the float and so the "stiction" effect is substantially eliminated. The surface tension forces due to the meniscus 6, 10 will have a slight tilting effect, but this is of second order magnitude in comparison with the tilting effect on a straight sided float.

Since the portion of the vessel 24 above the float is filled with a fluid, the pressure of which is to be measured, it sometimes happens that some fluid gets trapped under the lower peripheral edge of the upper part of the float. To facilitate the escape of any such fluid the junction between the lower surfaces of the two parts is rounded as at 17. This rounded part 17 also serves to confine the meniscus to the lower peripheral edge of the upper part, because the meniscus is unstable on the curved part and is forced back to the edge.

In the modification shown in Figure 4 a sloping portion 18 is provided to assist in the escape of any fluid caught under the float and a sloping portion 19 is provided to allow any of the supporting liquid which gets above the float to run off.

What is claimed is:

1. A float for use in a measuring instrument having a liquid column of a cross section only sufficiently greater than the cross section of the float to allow sideways play of the float under the action of its connecting mechanism when the liquid level changes, said float comprising a lower part having a bottom face terminating in a peripheral edge and an upper part positioned atop said lower part, said upper part having a lower face projecting beyond said lower part so as to provide an overhanging ledge and terminating in a well defined peripheral edge, said lower part providing such buoyancy when submerged in the liquid concerned that the said upper part is lifted clear of the liquid to the extent that its said overhanging lower face only is in the surface of the liquid and is gripped by the meniscus.

2. A float according to claim 1 in which the said peripheral edge of the lower part is in stepped disposition with reference to the peripheral edge of the said upper part.

3. A float according to claim 1 in which the junction between the peripheral edges of said parts is rounded concavely to avoid a sharp re-entrant corner.

4. A float according to claim 1 in which said upper part has a top surface which continuously slopes down from its centre to its periphery.

5. A float according to claim 1 in which the bottom surface of said lower part continuouosly slopes up from its centre to its periphery.

6. A float for use in a measuring instrument having a liquid column of a cross section only sufficiently greater than the cross section of the float to allow sideways play of the float under the action of its connecting mechanism when the liquid level changes, said float comprising an upper part having a lower face with a well defined peripheral edge and a lower part having a lower face with a well defined peripheral edge, said second mentioned peripheral edge being stepped inwardly with respect to said first mentioned peripheral edge over its entire length, said lower part providing such buoyancy when submerged in the liquid concerned as to ensure that the said upper part is lifted clear of the liquid to the extent that the lower face only of said upper part is in the surface of the liquid and is gripped by the meniscus.

7. A float according to claim 6 for use in a cylindrical float chamber wherein each of said parts is of substantially circular configuration.

References Cited in the file of this patent

UNITED STATES PATENTS 1,390,982   Eimke _____ Sept. 13, 1921